United States Patent
Fleming

(10) Patent No.: US 7,387,292 B1
(45) Date of Patent: Jun. 17, 2008

(54) APPARATUS TO CONNECT A STEM TO A VALVE MEMBER

(75) Inventor: Leslie E. Fleming, Marshalltown, IA (US)

(73) Assignee: Fisher Controls International, LLC, St. Louis, MO (US)

( * ) Notice: Subject to any disclaimer, the term of this patent is extended or adjusted under 35 U.S.C. 154(b) by 0 days.

(21) Appl. No.: 11/711,428

(22) Filed: Feb. 27, 2007

(51) Int. Cl.
*F16K 51/00* (2006.01)

(52) U.S. Cl. ........................ 251/357; 251/356

(58) Field of Classification Search ............... 251/356, 251/357
See application file for complete search history.

(56) References Cited

U.S. PATENT DOCUMENTS

| | | | | |
|---|---|---|---|---|
| 918,288 | A * | 4/1909 | Crowe | 251/357 |
| 941,652 | A * | 11/1909 | Rock | 251/357 |
| 1,686,849 | A * | 10/1928 | Frauenheim | 251/357 |
| 1,985,149 | A * | 12/1934 | Chapple | 251/357 |
| 2,057,150 | A * | 10/1936 | Kehl et al. | 251/356 |
| 2,121,315 | A * | 6/1938 | Black | 251/88 |
| 2,277,251 | A * | 3/1942 | Palmer | 251/357 |
| 2,457,492 | A * | 12/1948 | Raybould | 251/357 |
| 2,930,401 | A * | 3/1960 | Cowan | 251/357 |
| 3,059,895 | A * | 10/1962 | Brown | 251/357 |
| 5,201,335 | A | 4/1993 | Osgood et al. | |

OTHER PUBLICATIONS

U.S. Appl. No. 11/880,529, filed Jul. 23, 2007, Inventor William E. Wears.
U.S. Appl. No. 11/844,167, filed Aug. 23, 2007, Inventor Dennis Eugene O'Hara.

* cited by examiner

*Primary Examiner*—John Bastianelli
(74) *Attorney, Agent, or Firm*—Hanley, Flight and Zimmerman, LLC

(57) ABSTRACT

Apparatus to connect a stem to a valve member and, more particularly, apparatus to connect a threaded stem to a valve member of a control valve are disclosed. An example apparatus includes the threaded stem received in a threaded opening of the valve member and a plug received in an opening of the stem to expand diametrically the end of the stem to secure the threaded stem to the valve member.

19 Claims, 3 Drawing Sheets

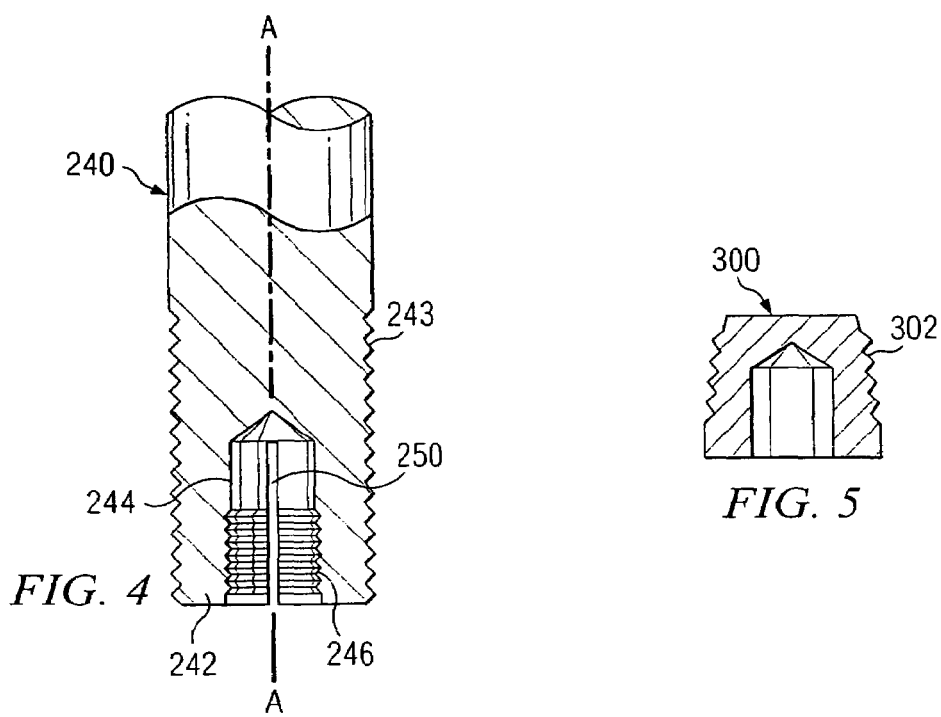
FIG. 4
FIG. 5
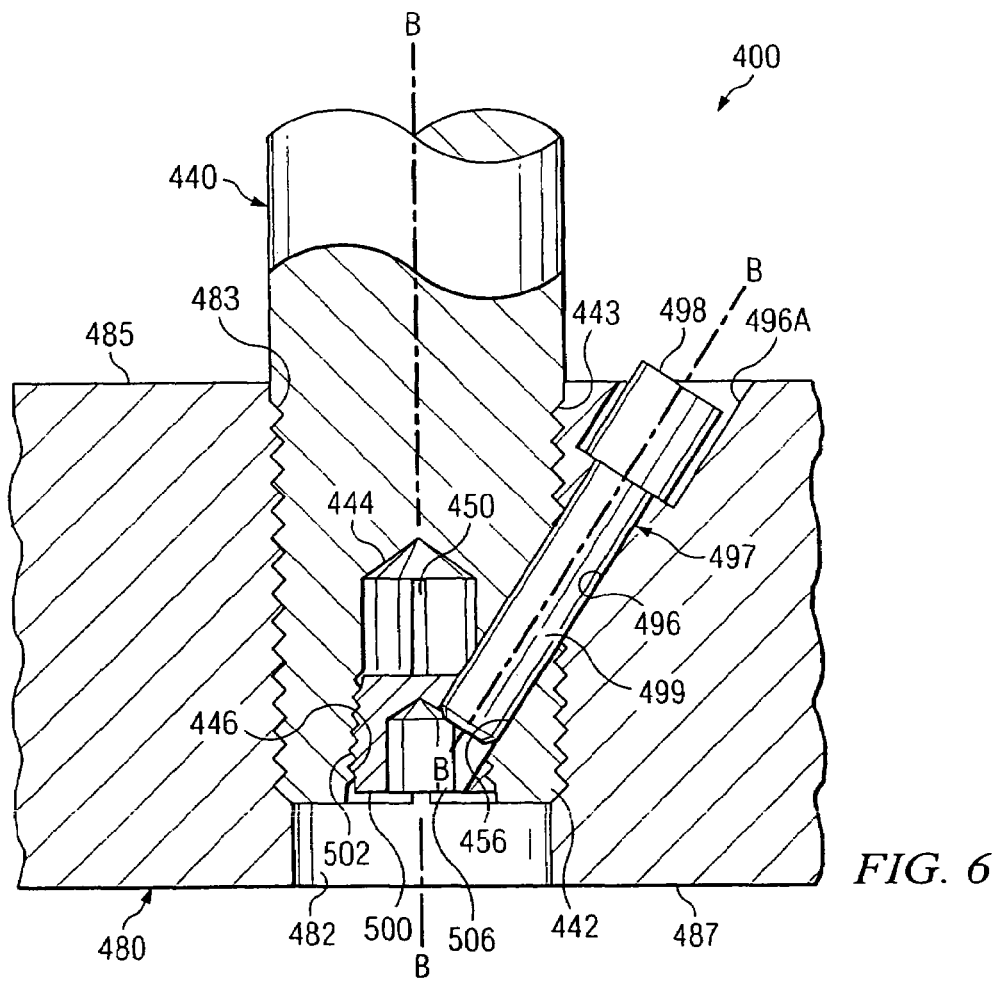
FIG. 6

APPARATUS TO CONNECT A STEM TO A VALVE MEMBER

FIELD OF THE DISCLOSURE

This disclosure relates generally to apparatus to connect a stem to a valve member and, more particularly, to apparatus to connect a threaded stem to a valve member of a control valve.

BACKGROUND

Industrial processing plants use control valves in a wide variety of applications such as, for example, controlling product flow in a food processing plant, maintaining fluid levels in large tank farms, etc. Automated control valves are used to manage the product flow or to maintain the fluid levels by functioning like a variable passage. The amount of fluid flowing through a valve body of the automated control valve can be accurately controlled by precise movement of a valve member (e.g., a plug). The control valve (e.g., a sliding stem valve) may include a stem connected via threads to the valve member at a threaded opening of the valve member so that the stem is oriented substantially perpendicular to the valve member. However, connecting the stem to the valve member can cause misalignment between the stem and the valve member and affect the integrity of the valve member.

FIG. 1 is a partially cut-away schematic illustration of a known sliding stem valve assembly 100. An actuator 110 is coupled to a stem 140 that extends into a valve assembly 170. FIG. 2 is an enlarged illustration of a portion of the valve assembly 170 of FIG. 1, including the stem 140. As more clearly shown in FIG. 2, an end 148 of the stem 140 has threads 143 and an angled opening 146. The valve assembly 170 has an inlet 172 communicating with a valve orifice 174 and an outlet 176. Fluid flow through the valve orifice 174 is controlled by a plug or valve member 180. The valve member 180 includes a central through opening 182 with threads 183, valve plug holes 184, and a counter bore 186 that extends at an angle from a valve surface 185 and toward a valve surface 187. The threads 143 at the end 148 of the stem 140 are received by the threads 183 of the valve member 180. As can be readily seen in FIG. 2, a pin 190, which is slightly larger in diameter than the counter bore 186, is located in the counter bore 186 of the valve member 180 and the angled opening 146 of the stem 140.

The stem 140 is coupled to the valve member 180 by threading the threads 143 into the threads 183 at the central through opening 182 to position the stem 140 substantially perpendicular to the valve member 180. After the stem 140 has been threaded tightly into the through opening 182, the counter bore 186 is drilled into the valve member 180 and the opening 146 is drilled into the end 148 of the stem 140. The pin 190 is then press-fitted into the counter bore 186 and the opening 146 to secure the stem 140 to the valve member 180 to prevent the valve member 180 from rotating relative to the stem 140 (i.e., non-rotatability). The stem 140 has solid contact alignment at the engagement of the upper most threads 143 with the upper most threads 183 in the central through opening 182. However, the engagement of the pin 190 with the end 148 of the stem 140 is near the valve surface 187. The force of the press fitting of the pin 190 into the stem 140 can result in the stem 140 being positioned at a non-perpendicular-angle (e.g., misaligned) relative to the valve member 180. The non-perpendicular misalignment of the stem 140 relative to the valve member 180 can affect the integrity of the coupling of the valve member 180 to the stem 140.

SUMMARY

An apparatus connects a stem to a valve member, and comprises the valve member having a threaded opening, the stem having threads about an exterior surface and an end of the stem having an opening extending along a longitudinal axis of the stem, the threads about the exterior surface of the stem received by the threaded opening of the valve member. A plug is received in the opening of the stem, and the threaded engagement of the stem in the threaded opening of the valve member and the receipt of the plug in the opening of the stem to expand diametrically the end of the stem, is to secure the stem to the valve member.

BRIEF DESCRIPTION OF THE DRAWINGS

FIG. 4 is an enlarged view of the stem illustrated in FIG. 3.

FIG. 5 is an illustration of the threaded plug illustrated in FIG. 3.

FIG. 6 is an illustration of another example apparatus to connect a stem to a valve member.

DETAILED DESCRIPTION

In general, the example apparatus to connect a stem to a valve member described herein may be utilized for connections between parts in various types of assemblies or devices. Additionally, while the examples disclosed herein are described in connection with the control of product flow for the industrial processing industry, the examples described herein may be more generally applicable to a variety of control operations for different purposes.

Figure 1:
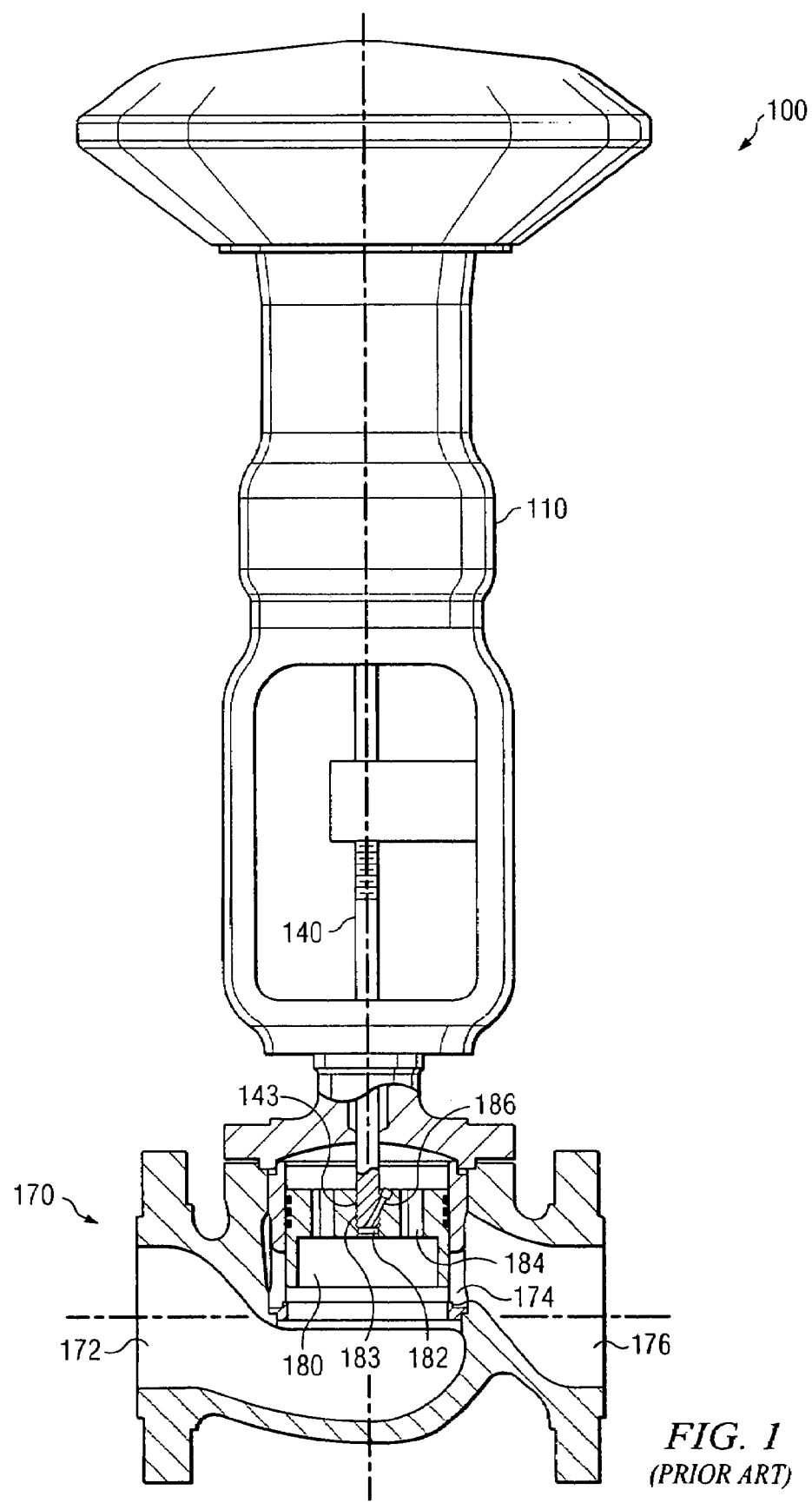
FIG. 1 is a partially cut-away schematic illustration of a known sliding stem valve assembly.
Figure 2:
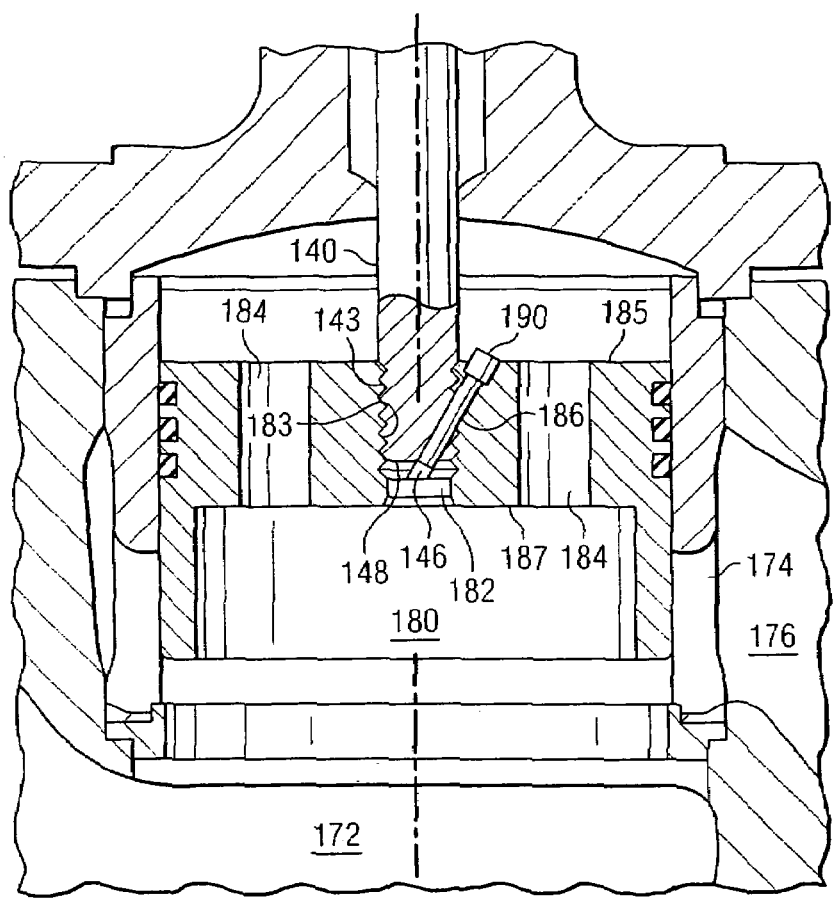
FIG. 2 is an enlarged illustration of a portion of the valve assembly in FIG. 1.
Figure 3:
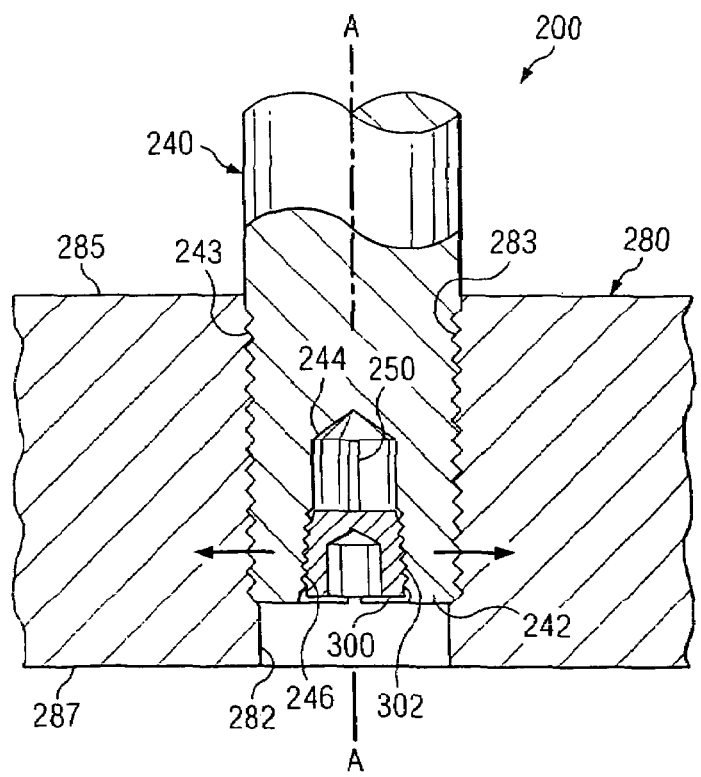
FIG. 3 is an illustration of an example apparatus to connect a stem to a valve member.

FIG. 3 is an illustration of an example apparatus 200 to connect a stem 240 to a valve member 280. The stem 240 includes threads 243 located about the exterior of an end 242 of the stem 240. Referring also to FIG. 4, the end 242 has a threaded opening 244 including threads 246. A slot 250 is located within the threaded opening 244 and oriented parallel to a longitudinal centerline or axis A-A of the stem 240. The slot 250 extends laterally through the entire end 242 of the stem 240.

As shown in FIG. 3, the valve member 280 includes a central through opening 282 extending between surfaces 285 and 287, and has therein threads 283. The stem 240 is threaded into or seated within the central through opening 282. A tapered plug or threaded member 300 has exterior threads 302 (see FIG. 5). Referring to FIG. 3, the exterior threads 302 of the tapered plug 300 are engaged by the threads 246 in the threaded opening 244 adjacent the end 242. As a result of its tapered shape, the plug 300 is retained in the opening 244 by a tight engagement with the threads 246 adjacent the end 242. Additionally, the plug 300 can be staked to cause it to expand and further secure the plug 300 in the threaded opening 244.

To assemble the example apparatus 200, the stem 240 is coupled to the valve member 280 by threading the threads 243 into the threads 283 of the central through opening 282. The tapered plug 300 is then seated or threaded into the threaded opening 244 of the stem 240. The insertion of the tapered plug 300 causes the end 242 to expand diametrically outwardly to tightly engage the threads 243 of the stem 240 with the threads 283 of the central through opening 282. The expansion of the end 242 is assisted or enhanced by the slot 250 in the threaded opening 244. The slot 250 extends entirely through the end 242 to equalize expansion from side to side of the end 242 and make alignment of the end 242 more consistent. The stem 240 achieves solid contact alignment at the engagement of the upper most threads 243 with the upper most threads 283 in the central through opening 282. The stem 240 also achieves solid contact alignment at the engagement of the lower most threads 243 adjacent the end 242 with the lower most threads 283 in the central through opening 282. Thus, the solid contact alignment of the end 242 with the valve member 280 minimizes the occurrence of non-perpendicular misalignment between the stem 240 and the valve member 280.

FIG. 6 is an illustration of another example apparatus 400 to couple a stem 440 to a valve member 480. Much of the apparatus 400 and the connection of the stem 440 to the valve member 480 is substantially the same as shown and described above in connection with FIGS. 3, 4 and 5 and, thus, in the interest of brevity, the description of the identical portions of FIGS. 3, 4 and 5 will not be repeated here. Instead, the interested reader is referred back to the corresponding description of FIGS. 3, 4 and 5. To facilitate this process, identical elements in FIG. 6 have been numbered with reference numerals increased by 200 above the corresponding elements in FIGS. 3, 4 and 5.

The example apparatus 400 in FIG. 6 includes additional or optional components to ensure that the stem 440 remains securely attached to the valve member 480. After the stem 440 has been threaded tightly into the central through opening 482 and the tapered plug or threaded member 500 inserted into the threaded opening 444, a single drilling operation can create a counter bore 496 in the valve member 480, an aligned bore or passage 456 in the end 442, and an aligned bore or passage 506 in the tapered plug 500. The counter bore 496 may include an enlarged bore portion 496A. The counter bore 496 and the aligned bores or passages 456 and 506 are positioned approximately at a thirty degree angle relative to a longitudinal axis B-B of the stem 440. A pin 497 has an enlarged head 498, and a shaft 499 with a diameter slightly larger than the counter bore 496 and the passages 456 and 506. The shaft 499 of the pin 497 is press fitted into the counter bore 496 and the passages 456 and 506, with the enlarged head 498 received in the enlarged bore portion 496A. The presence of the pin 497 in the counter bore 496 and passages 456 and 506 secures the stem 440 axially to the valve member 480 by preventing rotation therebetween.

Although certain example apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. Apparatus to connect a stem to a valve member of a valve, comprising:
   a valve member having a threaded opening;
   a stem having threads about an exterior surface, an end of the stem having an opening extending along a longitudinal axis of the stem, and the threads about the exterior surface to be received by the threaded opening of the valve member, and
   a plug to be received in the opening of the stem, the threaded engagement of the stem in the threaded opening of the valve member and the receipt of the plug in the opening of the stem to expand diametrically the end of the stem to secure the stem to the valve member, and a slot located in the opening of the stem to facilitate the expansion of the end of the stem.

2. Apparatus as defined in claim 1, wherein the plug is tapered and has threads to engage the opening in the stem.

3. Apparatus as defined in claim 1, wherein the plug is retained in the opening of the stem by being staked.

4. Apparatus as defined in claim 1, wherein the slot is parallel to the longitudinal axis of the stem.

5. Apparatus to connect a stem to a valve member of a valve, comprising:
   a valve member having a threaded opening;
   a stem having threads about an exterior surface, an end of the stem having an opening extending along a longitudinal axis of the stem, and the threads about the exterior surface to be received by the threaded opening of the valve member,
   a plug to be received in the opening of the stem,
   a bore extending between a surface of the valve member and the opening of the stem, and
   a pin to be inserted into the bore, the threaded engagement of the stem in the threaded opening of the valve member and the receipt of the plug in the opening of the stem to expand diametrically the end of the stem to secure the stem to the valve member.

6. Apparatus as defined in claim 5, wherein the bore is formed by drilling a hole in the valve member, the stem and the plug.

7. Apparatus as defined in claim 5, wherein at least a portion of the pin is larger than at least a portion of the bore to enable the pin to be press fitted in the bore.

8. Apparatus as defined in claim 5, wherein the bore is located at an angle relative to the longitudinal axis of the stem.

9. Apparatus as defined in claim 8, wherein the angle is approximately thirty degrees.

10. Apparatus as defined in claim 5, wherein the bore includes a larger diameter portion, the pin having a head with a first diameter and a shaft with a second diameter, wherein the first diameter is larger than the second diameter and the head to be received within the larger diameter portion of the bore.

11. Apparatus connecting a stem to a valve member of a control valve, comprising:
    a valve member having a threaded opening;
    a stem having threads about an exterior surface, an end of the stem having a threaded opening extending along a longitudinal axis of the stem, and a slot located in the opening of the stem, the threads about the exterior surface received by the threaded opening of the valve member, and
    a threaded member received in the threaded opening of the stem, the stem secured to the valve member by the threaded engagement of the stem in the threaded opening of the valve member and the receipt of the threaded member in the threaded opening of the stem to expand diametrically the end of the stem to secure the stem to the valve member.

12. Apparatus as defined in claim 11, wherein the threaded member has a tapered shape.

13. Apparatus as defined in claim 11, wherein the threaded member is retained in the threaded opening of the stem by being staked.

14. Apparatus as defined in claim 11, wherein the threaded opening of the valve member extends through the valve member.

15. Apparatus as defined in claim 11, wherein the slot is parallel to the longitudinal axis of the stem.

16. Apparatus as defined in claim 11, further comprising a bore extending between a surface of the valve member and the threaded opening of the stem, and a pin inserted into the bore.

17. Apparatus as defined in claim 16, wherein the bore is formed by drilling a hole in the valve member, stem and threaded member.

18. Apparatus as defined in claim 16, wherein at least a portion of the pin is larger than at least a portion of the bore, wherein the pin is press fitted in the bore.

19. Apparatus as defined in claim 16, wherein the bore is located at an angle relative to the longitudinal axis of the stem.

* * * * *